United States Patent [19]

Nagano

[11] 4,397,916

[45] Aug. 9, 1983

[54] LAMINATED MULTILAYER STRUCTURE

[75] Inventor: Riichiro Nagano, Waki, Japan

[73] Assignee: Mitsui Petrochemical Industries, Ltd., Tokyo, Japan

[21] Appl. No.: 237,610

[22] Filed: Feb. 24, 1981

[30] Foreign Application Priority Data

Feb. 29, 1980 [JP] Japan ................................. 55-24078
Feb. 29, 1980 [JP] Japan ................................. 55-24079
Dec. 23, 1980 [JP] Japan ................................. 55-181331

[51] Int. Cl.$^3$ .......................................... B32B 15/08
[52] U.S. Cl. ................................. 428/461; 428/475.8; 428/476.1; 428/476.9; 428/483; 428/469; 428/516; 428/520; 428/910; 428/35; 428/462
[58] Field of Search ............ 428/461, 462, 483, 475.8, 428/476.9, 476.1, 516, 518, 520

[56] References Cited

U.S. PATENT DOCUMENTS

| | | | |
|---|---|---|---|
| 3,931,449 | 1/1976 | Hirata et al. ................... | 428/519 X |
| 4,058,647 | 11/1977 | Inoue et al. .................... | 428/492 X |
| 4,269,321 | 5/1981 | Ichinose et al. ................ | 428/516 X |
| 4,308,084 | 12/1981 | Ohtusuki et al. ............... | 428/461 X |
| 4,311,742 | 1/1982 | Otsuka ........................... | 428/461 |

FOREIGN PATENT DOCUMENTS 55-93449 7/1980 Japan ................................. 428/516

Primary Examiner—P. Ives
Attorney, Agent, or Firm—Sherman & Shalloway

[57] ABSTRACT

In a laminated multilayer structure composed of (A) a layer of a graft-modified ethylene resin grafted with an unsaturated carboxylic acid or a functional derivative thereof and (B) an oxygen- or nitrogen-containing polar resin layer or a metal layer in contact with the layer (A); the improvement wherein (1) the layer (A) consists of (i) 1 to 100% by weight of said graft-modified ethylene resin derived from an ethylene polymer which contains 0 to 15 mole % of at least one alpha-olefin having 3 to 30 carbon atoms as a comonomer and has an $MI_2/[\eta]^{-8.77}$ ratio in absolute value of not less than 15 and a density of 0.88 to 0.98 g/cm$^3$, and (ii) 99 to 0% by weight of an unmodified ethylene polymer containing 0 to 50 mole % of at least one alpha-olefin having 3 to 30 carbon atoms as a comonomer and having an $MI_2/[\eta]^{-8.77}$ ratio in absolute value of not less than 15 and a density of 0.86 to 0.96 g/cm$^3$, and (2) the layer (A) has (a) an ethylene content of not less than 80 mole %, (b) a content of the carboxylic acid or the derivative thereof of 0.01 to 10% by weight based on the weight of the layer (A), (c) a density of 0.88 to 0.98 g/cm$^3$, and (d) an $MI_{10}/MI_2$ ratio of from 5 to 18.

7 Claims, No Drawings

LAMINATED MULTILAYER STRUCTURE

This invention relates to an improved laminated multilayer structure composed of (A) a layer of a graft-modified ethylene resin grafted with an unsaturated carboxylic acid or a functional derivative thereof, and directedly attached thereto, (B) an oxygen- or nitrogen-containing polar resin layer such as a layer of a polyamide resin, a saponified copolymer of ethylene and vinyl acetate or a polyester resin, or a metal layer.

This structure has a greatly improved peel strength between layers (A) and (B), which is conducive to elimination of the trouble of delamination both at room temperature and high temperatures under severe conditions. It also has greatly improved impact strength characteristics such as low-temperature impact strength and falling impact strength. The structure further possesses good rigidity and other mechanical properties, heat stability, transparency, gas-barrier property and steam barrier property, and is useful in the fields of packaging materials, containers, interior and exterior panels of buildings, advertisement panels, etc.

Attempts have heretofore been made to provide a laminated multilayer structure consisting of a layer of a polyolefin and a layer of another resin such as a polyamide resin, a polyester resin or a saponified copolymer of ethylene and vinyl acetate or a metal layer in which the two layers inherently have poor affinity for each other, by modifying the polyolefins and/or polyamides by various means to increase the adhesive strength between the two layers.

It has been known to increase the adhesive strength in such a multilayer structure by utilizing a high-density polyethylene grafted with an aliphatic dicarboxylic acid or its functional derivative as the polyolefin resin layer. Such a method, however, suffers from the defect that a satisfactory adhesive strength is difficult to maintain over a long period of time and the adhesive strength is insufficient under severe service conditions. Accordingly, it has been suggested to utilize an ethylene polymer or copolymer modified with a special unsaturated fused ring carboxylic acid anhydride as a grafting monomer, or a composition obtained by blending a rubbery or elastomeric component with polyethylene having grafted thereto an aliphatic dicarboxylic acid or its functional derivative to increase the adhesive strength.

For example, U.S. Pat. No. 4,058,647 discloses a laminated resin product composed of (1) a gas-barrier polymer layer of a polyester, a polyamide or a hydrolyzed copolymer of ethylene and vinyl acetate and (2) a modified polyolefin composition layer laminated thereon, wherein said modified polyolefin composition is a mixture of 60 to 97% of a polyolefin which polyolefin comprises 0.1 to 100% by weight of a polyolefin modified with an unsaturated carboxylic acid or the anhydride thereof such that the unsaturated acid or anhydride content is from 0.01 to 10% by weight of the total polyolefin content and wherein an unmodified polyolefin comprises from 99.9 to 0% by weight of the total polyolefin content with 40 to 3% by weight of a rubber component having a Mooney viscosity (50 ML$_{1+4}$, 100° C.) of 40 to 150.

In use at high temperatures, for example in the case of retort pouches for cooking, or under severe conditions, for example in the case of gasoline tanks requiring sufficient impact strength and of metal panels, satisfactory adhesive strength cannot be obtained, or the properties of the olefin resin are adversely affected. Accordingly, further improvement has been desired.

The present inventors have made extensive investigations in order to overcome the aforesaid troubles associated with the previously suggested laminated multilayer structure composed of (A) a layer of a graft-modified ethylene resin grafted with an unsaturated carboxylic acid or a functional derivative thereof and (B) an oxygen- or nitrogen-containing polar resin layer or a metal layer in contact with the layer (A).

As a result, they found that the use of a layer (A) having a specified $MI_{10}/MI_2$ ratio and at the same time satisfying specified ranges of ethylene content, graft monomer content and density, particularly a layer (A) composed of a mixture of a graft-modified ethylene resin and an unmodified ethylene polymer which have a specified $MI_2/[\eta]^{-8.77}$ and specified density, removes the aforesaid troubles, and gives a laminated multilayer structure which as compared with conventional similar multilayer structures, has at least about two times as high a bond strength at room temperature and high temperatures, greatly improved impact strength characteristics such as low-temperature impact strength and falling impact strength, and other excellent properties.

It has also been found that even when a rubbery polymer is used as the unmodified ethylene polymer, the use of a layer (A) satisfying a combination of parameters in accordance with this invention further increases bond strength at high temperatures, for instance even at 100° C. This discovery is surprising in view of the fact that according to the common technical knowledge in the art, the use of a rubbery polymer results in a lower bond strength between the layers (A) and (B) at higher temperatures.

It is an object of this invention therefore to provide a laminated multilayer structure composed of the aforesaid layers (A) and (B) having markedly improved properties.

The above and other objects and advantages of this invention will become apparent from the following description.

According to this invention, there is provided a laminated multilayer structure composed of (A) a layer of a graft-modified ethylene resin grafted with an unsaturated carboxylic acid or a functional derivative thereof and (B) an oxygen- or nitrogen-containing polar resin layer or a metal layer in contact with the layer (A); characterized in that (1) the layer (A) consists of
  (i) 1 to 100% by weight of said graft-modified ethylene resin derived from an ethylene polymer which contains 0 to 15 mole% of at least one alpha-olefin having 3 to 30 carbon atoms as a comonomer and has an $MI_2/[\eta]^{-8.77}$ ratio in absolute value of not less than 15 and a density of 0.88 to 0.98 g/cm$^3$, and
  (ii) 99 to 0% by weight of an unmodified ethylene polymer containing 0 to 50 mole% of at least one alpha-olefin having 3 to 30 carbon atoms as a comonomer and having an $MI_2/[\eta]^{-8.77}$ ratio in absolute value of not less than 15 and a density of 0.86 to 0.96 g/cm$^3$, and (2) the layer (A) has
  (a) an ethylene content of not less than 80 mole%,
  (b) a content of the carboxylic acid or the derivative thereof of 0.01 to 10% by weight based on the weight of the layer (A),
  (c) a density of 0.88 to 0.98 g/cm$^3$, and
  (d) an $MI_{10}/MI_2$ ratio of from 5 to 18.

MI$_{10}$ means the melt index at 190° C. under a load of 10 kg measured in accordance with ASTM D1238, and MI$_2$ denotes the melt index at 190° C. under a load of 2,160 g (2.16 kg) measured in accordance with ASTM D1238.

The intrinsic viscosity [η] denotes the intrinsic viscosity number (dl/g) of a polymer measured in decalin solution at 135° C.

The density denotes the value (g/cm$^3$) measured in accordance with ASTM D1505.

In the laminated multilayer structure of this invention, the layer (A) consists of a mixture of the two ethylene polymers (i) and (ii).

The graft-modified ethylene resin (i) is obtained by modifying an ethylene polymer containing 0 to 15 mole% of an alpha-olefin having 3 to 30 carbon atoms as a comonomer with an unsaturated carboxylic acid or a functional derivative thereof. Such a graft-modified ethylene resin itself is known, and can be produced by methods known per se.

Examples of the unsaturated carboxylic acids are those having 2 to 20 carbon atoms such as acrylic acid, methacrylic acid, maleic acid, fumaric acid and itaconic acid. The functional derivatives thereof include, for example, the anhydrides, ester derivatives, amide derivatives, imide derivatives, and metal salts (such as alkali metal salts) of unsaturated carboxylic acids.

Unsaturated dicarboxylic acids having 4 to 10 carbon atoms and the functional derivatives thereof, particularly the anhydrides thereof, are the especially preferred grafting monomers.

These grafting monomers include, for example, maleic acid, fumaric acid, itaconic acid, citraconic acid, allylsuccinic acid, cyclohex-4-ene-1,2-dicarboxylic acid, 4-methylcyclohex-4-ene-1,2-dicarboxylic acid, bicyclo[2.2.1]hept-5-ene-2,3-dicarboxylic acid, x-methylbicyclo[2.2.1]hept-5-ene-2,3-dicarboxylic acid, maleic anhydride, itaconic anhydride, citraconic anhydride, allylsuccinic anhydride, cyclohex-4-ene-1,2-dicarboxylic anhydride, 4-methylcyclohex-4-ene-1,2-dicarboxylic anhydride, bicyclo[2.2.1]hept-5-ene-2,3-dicarboxylic anhydride, and x-methylbicyclo[2.2.1]hept-5-ene-2,2-dicarboxylic anhydride.

Examples of other grafting monomers include $C_1-C_8$ alkyl esters or glycidyl ester derivatives of unsaturated carboxylic acids such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, and diethyl itaconate; amide derivatives of unsaturated carboxylic acids such as acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide and fumaric N,N-dibutylamide; imide derivatives of unsaturated carboxylic acids such as maleimide, N-butylmaleimide and N-phenylmaleimide; and metal salts of unsaturated carboxylic acids such as sodium acrylate, sodium methacrylate, potassium acrylate and potassium methacrylate.

Various known methods can be used to graft a grafting monomer to the ethylene polymer which may contain up to 15 mole% of at least one alpha-olefin having 3 to 30 carbon atoms as a comonomer. For example, this can be achieved by heating the ethylene polymer and the grafting monomer at high temperatures of, say, about 150° to about 300° C. in the presence or absence of a solvent with or without a radical initiator. Another vinyl monomer may be present during the grafting reaction. Suitable solvents that may be used in this reaction are benzene, toluene, xylene, chlorobenzene, cumene, etc. Suitable radical initiators that may be used include t-butyl hydroperoxide, cumene hydroperoxide, diisopropylbenzene hydroperoxide, di-t-butyl peroxide, t-butyl cumyl peroxide, (dicumyl peroxide, 1,3-bis-(t-butylperoxyisopropyl)benzene, acetyl peroxide, benzoyl peroxide, isobutyryl peroxide, bis-3,5,5-trimethylhexanoyl peroxide, and methyl ethyl ketone peroxide.

In the graft-modified ethylene resin obtained in the aforesaid manner, the amount of the carboxylic acid or its functional derivative can be suitably selected, but is preferably 0.01 to 10%, more preferably 0.1 to 5%, based on the weight of the layer (A). The amount of the monomer grafted is determined by measuring the oxygen content of the graft copolymer by oxygen analysis and the absorption intensities of the graft copolymer near 1710, 1790 and 1860 cm$^{-1}$ by infrared absorption spectroscopic analysis.

An ethylene polymer having an MI$_2$/[η]$^{-8.77}$ ratio in absolute value of not less than 15 and a density of 0.88 to 0.98 g/cm$^3$ is used as the ethylene polymer containing 0 to 15 mole% of the aforesaid alpha-olefin. Use of ethylene polymers which do not meet the requirements for the MI$_2$/[η]$^{-8.77}$ and density requirements fails to give the outstanding improving effects in accordance with this invention in regard to delamination strength at room and elevated temperatures and impact strength at low temperatures in the resulting laminated structure.

The unmodified ethylene polymer (ii) used as a mixture with the graft-modified ethylene resin (i) contains 0 to 50 mole% of an alpha-olefin having 3 to 30 carbon atoms as a comonomer and has an MI$_2$/[η]$^{-8.77}$ ratio of not less than 15 and a density of 0.86 to 0.96 g/cm$^3$. This unmodified ethylene polymer (ii) embraces a broad range of ethylene polymers ranging from plastics to rubbery resins.

Examples of the alpha-olefin having 3 to 30 carbon atoms as an optional comonomer include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene, and 1-triacontene. These alpha-olefins may be used singly or as a mixture of two or more.

Examples of rubbery resins as the polymer (ii) are an ethylene/propylene copolymer rubber, an ethylene/propylene/diene copolymer rubber, an ethylene/1-butene copolymer rubber, an ethylene/1-butene/diene copolymer rubber, an ethylene/propylene/1-butene copolymer rubber, an ethylene/propylene/1-butene/diene copolymer rubber, ethylene/4-methyl-1-pentene copolymer rubber, and mixtures of at least two of these rubbers with each other. Of these, the ethylene/propylene copolymer rubbers and the ethylene/1-butene copolymer rubber are most preferred. Preferably, the ethylene/propylene copolymer rubber and the ethylene/1-butene copolymer rubber have a melt index (measured at 190° C. in accordance with ASTM D1238-65T) of 0.1 to 20, and an ethylene content of 60 to 90 mole%.

In the laminated multilayer structure of this invention, the amounts of the graft-modified ethylene resin (i)

and the unmodified ethylene polymer (ii) constituting the layer (A) can be properly chosen. Based on the total weight of (i) and (ii), the amount of (i) may be selected from 1 to 100% by weight, preferably from 3 to 100% by weight, and the amount of (ii) may be selected from 99 to 0% by weight, preferably 97 to 0% by weight.

In addition, the layer (A) in the laminated multilayer structure of this invention should meet the following requirements (a) to (d).

(a) It should contain ethylene in an amount of not less than 80 mole%, preferably not less than 90 mole%.

(b) It should contain the carboxylic acid or the derivative thereof in an amount of 0.01 to 10% by weight, preferably 0.05 to 5% by weight, based on the weight of the layer (A).

(c) It should have a density of 0.88 to 0.98 g/cm$^3$.

(d) It should have an $MI_{10}/MI_2$ ratio of from 5 to 18, preferably from 6 to 18.

Thus, the layer (A) in the structure of this invention is subjected to the further limitation that the graft-modified ethylene resin (i) and the unmodified ethylene polymer (ii) as a mixture are selected so as to meet the requirements (a) to (d) as a mixture.

By the limitation (a), the alpha-olefin comonomers used in (i) and (ii) should be properly selected so that the total amount of these is consistent with the specified ethylene content. If the ethylene content (a) of the layer (A) is less than the specified limit, delamination may occur at a high temperature in the resulting laminated structure.

The further limitation (b) restricts the amount of the grafting monomer in the resin (i) and the mixing ratio between (i) and (ii). If the amount of the carboxylic acid or the derivative thereof is less than the specified lower limit (b), sufficient delamination strength cannot be obtained, and if it exceeds the specified upper limit, the modified ethylene polymer has an increased gel content and its moldability is reduced.

The mixing ratio between the (i) and (ii) and the densities of the components (i) and (ii) are further restricted by the limitation (c). If the density of the layer (A) is lower than the specified lower limit in (c), bond strength at a high temperature decreases, and if it exceeds the specified upper limit, the resin becomes brittle and therefore, the resulting laminated structure has lowered impact strength. The densities and amounts of (i) and (ii) should be selected so that the layer (A) meets and requirement (c).

The layer (A) should further meet the specified ratio of $MI_{10}/MI_2$ in (d) above. Accordingly, the $MI_{10}/MI_2$ and amounts of the resin (i) and the polymer (ii) should be selected so that the resulting layer (A) satisfies the $MI_{10}/MI_2$ ratio specified in (d).

The $MI_{10}/MI_2$ ratio of the layer (A) is an important factor in this invention in conjunction with the other parameters. If the $MI_{10}/MI_2$ ratio of layer (A) is lower than 5, the moldability of the layer (A) is inferior, and if it exceeds 18, high delamination strength cannot be obtained.

The layer (A) having an $MI_{10}/MI_2$ ratio of from 5 to 18 may be obtained by using the graft-modified ethylene resin (i) alone having an $MI_{10}/MI_2$ ratio of from 5 to 18, or by using graft-modified ethylene resins (i) having different $MI_{10}/MI_2$ ratios and blending them so that the resulting blend has an $MI_{10}/MI_2$ ratio of from 5 to 18. Alternatively, the graft modified ethylene resin (i) and the unmodified ethylene polymer (ii) are used and mixed so that the mixture has an $MI_{10}/MI_2$ ratio of from 5 to 18. Some embodiments of the blend of (i) and (ii) having the above-specified $MI_{10}/MI_2$ ratio are shown below.

(1) A mixture of a modified ethylene resin having an $MI_{10}/MI_2$ ratio of not more than 18 and an unmodified ethylene polymer having an $MI_{10}/MI_2$ ratio of more than 18.

(2) A mixture of an ethylene modified ethylene resin having an $MI_{10}/MI_2$ ratio of more than 18 and an unmodified ethylene polymer having an $MI_{10}/MI_2$ ratio of not more than 18.

(3) A mixture of a modified ethylene resin having an $MI_{10}/MI_2$ ratio of less than 5 and an unmodified ethylene polymer having an $MI_{10}/MI_2$ ratio of at least 5.

(4) A mixture of a modified ethylene resin having an $MI_{10}/MI_2$ ratio of at least 5 and an unmodified ethylene polymer having an $MI_{10}/MI_2$ ratio of less than 5.

(5) A mixture of a modified ethylene resin and an unmodified ethylene polymer both of which have an $MI_{10}/MI_2$ ratio outside the range of 5 to 18.

(6) A mixture of a modified ethylene resin and an unmodified ethylene polymer both of which have an $MI_{10}/MI_2$ ratio within the range of 5 to 18.

In the present invention, the layer (A) is composed of the graft-modified ethylene resin (i) or a mixture of it with the ethylene polymer (ii). In using the mixture of (i) and (ii), it may be prepared by any methods of mixing which permit homogeneous mixing of the two components. There can be used, for example, a method which involves mixing the individual components (i) and (ii) by a ribbon blender, tumbler, Henschel mixer, etc., a method involving melt-kneading the mixture obtained by the aforesaid method in an extruder, a Banbury mixer, a two-roll mill, a kneader, etc., and a method involving dissolving the individual components in solvents, well mixing the solutions with stirring, and then adding a non-solvent for precipitation.

The aforesaid composition composed of (i) and (ii) may further include various additives such as antioxidants, ultraviolet absorbers, antistatic agents, pigments, dyes, nucleating agents, fillers, slip agents, lubricants, fire retardants, and antiblocking agents.

Examples of the antioxidants are 2,6-di-t-butyl-p-cresol, O-t-butyl-p-cresol, tetrakis-[methylene-3-(3,5-di-t-butyl-4-hydroxyphenyl)propionate)methane, $\beta$-naphthylamine, and para-phenylenediamine.

Examples of the ultraviolet absorbers are 2,4-dihydroxybenzophenone, 2-(2'-hydroxy-3',5'-di-t-butylphenyl)-5-chlorobenzotriazole, 2-(2-hydroxy-3-t-butyl-5-methylphenyl)-5-chlorobenzotriazole, and bis(2,2',6,-6')-tetramethyl-4-piperidine)sebacate.

Examples of the antistatic agents are lauryl diethanolamine, palmityl diethanolamine, stearyl diethanolamine, oleyl diethanolamine, behenyl diethanolamine, polyoxyethylene alkylamines, stearyl monoglyceride, and 2-hydroxy-4-n-octoxybenzophenone.

Examples of colorants including pigments and dyes are carbon black, titanium white, cadmium yellow and copper phthalaocyanine blue.

Examples of the nucleating agents are aluminum p-tert-butylbenzoate, dibenzylidene sorbitol, and aluminum hydroxy-di-p-t-butylbenzoate.

Examples of the fillers are glass fibers, carbon fibers, talc, clay, silica, calcium carbonate, barium sulfate, magnesium hydroxide, calcium hydroxide and calcium oxide.

Examples of the slip agents are stearamide, oleamide and erucinamide.

Examples of the lubricants are calcium stearate, zinc stearate, aluminum stearate, magnesium stearate, and polyethylene wax.

Examples of the fire retardants are antimony oxide, decabromobiphenyl ether, and bis(3,5-dibromo-4-bromopropyloxyphenyl)sulfone.

Examples of the antiblocking agents are silicon dioxide and polystyrene.

The amounts of these other additives may be selected from suitable amounts which do not adversely affect the objects of this invention. For example, based on the total weight of the resins (i) and (ii), the suitable amounts are about 0.01 to about 5% by weight for the antioxidants; about 0.01 to about 5% by weight for the ultraviolet absorbers; about 0.01 to about 1% by weight for the antistatic agents; about 0.01 to about 5% by weight for the coloring agents; about 0.01 to about 5% by weight for the nucleating agents; about 0.1 to about 60% by weight for the fillers; about 0.01 to about 1% by weight for the slip agents; about 0.01 to about 1% by weight for the lubricants; about 0.1 to about 50% by weight for the fire retardants; and about 0.01 to about 30% by weight for the antiblocking agents.

The laminated multilayer structure of this invention is composed of the layer (A) which satisfies the combination of parameters described hereinabove, and (B) an oxygen- or nitrogen-containing polar resin layer or a metal layer in contact with the layer (A).

Examples of preferred polar resins in layer (B) are polyamide resins, a saponified copolymer of ethylene and vinyl acetate, and polyesters. More specifically, they include long-chain synthetic polyamides having recurring units of the amide group in the main chain, such as nylon 6, nylon 66, nylon 610, nylon 11 and nylon 12; a saponified copolymer of ethylene and vinyl acetate having a degree of saponification of about 90 to 100 mole% obtained by saponifying an ethylene/vinyl acetate copolymer having an ethylene content of about 15 to about 60 mole%; polyesters such as polyethylene terephthalate and polybutylene terephthalate; and mixtures thereof.

The metal layer as the layer (B) may, for example be a foil, film or sheet of a metal such as aluminum, iron, copper, tin and nickel, or of an alloy containing at least one of such metals as a main component. An aluminum foil, film or sheet and a stainless steel foil, film or sheet are preferred. The thickness of the foil, film or sheet can be properly selected, and for example, it is about 0.01 to about 0.2 mm. In using the metal layer (B), it is the usual practice to degrease the surface of the metal layer prior to lamination to the layer (A).

The oxygen- or nitrogen-containing polar resin layer (B) may also contain known additives in conventional amounts. Such additives may include, for example, about 0.01 to about 5% by weight, based on the weight of the resin, of antioxidants such as 2,6-di-tert.butyl-p-cresol, O-t-butyl-p-cresol, tetrakis-[methylene-3-(3,5-di-tert.butyl-4-hydroxyphenyl)-propionate]methane, copper naphthenate, p-benzoquinone, trioctyl phosphite, and tributyl phosphite; about 0.01 to about 5% by weight, based on the weight of the resin, of about 0.01 to about 5% by weight of ultraviolet absorbers such as 2,4-dihydroxybenzophenone, 2,2-dihydroxybenzophenone, 2-(2'-hydroxy-3,5-di-tert.-butylphenyl)-5-chlorobenzotriazole, 2-(2-hydroxy-3-tert.butyl-5-methylphenyl)-5-chlorobenzotriazole, and bis-(2,2',6,6'-tetramethyl-4-piperidine)sebacate; about 0.01 to about 5% by weight, based on the weight of the resin, of coloring agents such as titanium oxide, cadmium yellow, copper phthalocyanine blue and carbon black; about 0.1 to about 60% by weight, based on the weight of the resin, of fillers such as glass fibers, carbon fibers, talc, clay, silica, calcium carbonate, barium sulfate, magnesium hydroxide, calcium hydroxide and calcium oxide; about 0.01 to about 1% by weight, based on the weight of the resin, of antiblocking agents such as stearamide, palmitylamide and oleylamine; about 0.01 to about 1% by weight, based on the weight of the resin, of slip agents such as stearamide, oleylamide and erucamide; about 0.01 to about 1% by weight, based on the weight of the resin, of antistatic agents such as sodium-alkyl.diphenylether.disulfonate; and about 0.1 to about 50% by weight, based on the weight of the resin, of fire retardants such as antimony oxide, decabromobiphenyl ether, and bis-(3,5-dibromo-4-bromopropyloxyphenyl)-sulfone.

The laminated structures in accordance with this invention may be in various forms. For example, it is a two-layer structure composed of the layers (A) and (B) in contact with each other. Or it may be a three-layer sandwich structure composed of the layers (A), (B) and (A) or the layers (B), (A) and (B) in this order. There can also be obtained a structure having four or more layers composed of the aforesaid three-layer structures and the layer (A) or (B) placed as a topmost layer on either side of the three-layer structure.

There may also be provided a multilayer laminated structure which is composed of any one of the above-exemplified structures and laminated thereto, a layer of a polymer having adhesiveness to the modified ethylene polymer, nylon or EVA copolymer, for example polypropylene, polyethylene and ethylene/alpha-olefin copolymers which are adhesive to the modified ethylene polymer, or an EVA copolymer which is adhesive to nylon, or nylon and polyester resins which are adhesive to the EVA copolymer. Examples of possible combinations are a three-layer structure such as polyethylene/modified ethylene polymer/nylon or EVA copolymer, and modified ethylene polymer/EVA copolymer or nylon/nylon or EVA copolymer; a four-layer structure such as polyethylene/modified ethylene polymer/nylon or EVA copolymer/modified ethylene polymer, and polyethylene/modified ethylene polymer/EVA copolymer or nylon/nylon or EVA copolymer; and a five-layer structure such as polyethylene/modified ethylene polymer/nylon or EVA copolymer/modified ethylene polymer/polyethylene. Various other combinations are possible which contain modified ethylene polymer/nylon or EVA copolymer as constituent elements. In these laminated structures, any one of the constituent layers may be oriented monoaxially or biaxially.

Furthermore, various combinations of multilayer laminated structures are possible which include modified ethylene polymer/metal foil, polyethylene/modified ethylene polymer/metal foil, polyethylene/modified ethylene polymer/metal foil/modified ethylene polymer, and other laminated structures containing modified ethylene polymer/metal foil as constituent elements.

The laminated multilayer structure of this invention can be produced by means known per se. For example, it can be produced by melting the individual components in separate extruders, and co-extruding them through a single die near the exit of the extruders. The temperature of the grafted high-density polyethylene resin composition during the co-extrusion is about 130° C. to about 300° C., preferably about 150° C. to about 250° C. The temperature of the polyamide resin to be co-extruded is from its melting point to about 300° C., preferably from a point about 10° C. above its melting point to about 280° C. For example, when the polyamide resin is nylon 6, its temperature during co-extrusion is about 230° to about 300° C., preferably about 240° to about 280° C. The polyester resin being co-extruded may have a temperature ranging from a point 10° C. above its melting point to 300° C., preferably 270° to 280° C. The saponified copolymer of ethylene and vinyl acetate may have a temperature of from 170° C. to 260° C., preferably 180° to 230° C., during the co-extrusion.

It is also possible to extrude the graft-modified ethylene resin layer onto the aforesaid resin layer. When the metal layer is used, the graft-modified ethylene resin layer may be laminated onto it by such means as press-forming, extrusion laminating, extrusion coating, and powder coating. At this time, the metal layer may be heated, and elevated pressures may be used.

The laminated multilayer structure of this invention can be used in the form of films, sheets, boards, pipes, hollow containers, etc.

The multilayer structure of this invention has markedly improved adhesive strength, and is free from delamination which has conventionally been encountered during use at high temperatures or under severe conditions. Thus, by taking advantages of the high rigidity, mechanical strength, heat stability, gas-barrier property, steam-barrier property, etc. of the constituent layers, the laminated multilayer structure of this invention can be used suitably in various applications, for example packaging materials for vegetables, meats, dairy products, etc., food packaging materials such as packaging films, containers and cook-in pouches for seasonings, edible oils, medicines, etc., gasoline tanks, drum cans and large-sized containers which require impact strength and oil resistance, and building materials and the like such as interior and exterior finishing or trimming panels of buildings, and advertisement panels.

The following Examples and Comparative Examples further illustrate the present invention. It is to be understood, however, that the present invention is not limited by these Examples.

Examples 1 to 4 and Comparative Examples 1 and 2

Maleic anhydride was grafted to each of the ethylene polymers indicated in Table 1 to give graft-modified ethylene resins shown in Table 2.

Each of the graft-modified ethylene resins as a layer (A) was melted in an extruder and fed to a coextrusion die while keeping the resin temperature at 190° C. Nylon 6 (Amilan CM-1046, a trademark for a product of Toray Industries, Inc.) as a layer (B) was melted in another extruder, and fed to the coextrusion die while keeping the resin temperature at 240° C. High-density polyethylene ($MI_2$ 0.04; density 0.956) was melted in still another extruder, and fed to the coextrusion die while keeping the resin temperature at 230° C.

A three-layered parison was extruded from the coextrusion die, and blow molded in a mold for forming a bottle. The bottle formed was a cylindrical bottle having an inner capacity of 500 cm$^3$ and consisting of an outer layer of high-density polyethylene (thickness 1 mm), an interlayer of the layer (A) (thickness 0.1 mm) and an inner layer of the layer (B) (thickness 0.2 mm).

The delamination strength and low-temperature impact strength of the bottle were measured, and the results are shown in Table 3. The methods of measurement were as follows:

The delamination strength is shown as the peel strength measured by the method of a peel test.

A test specimen, 10 mm in width, was cut off from the side wall of the composite bottle, and was partly delaminated between the layers (A) and (B). It was then subjected to a peel test at 23° C. at a peel angle of 180° by pulling the specimen at a speed of 50 mm/min. with an Instron tester. Thus, the peel strength (kg/cm) of the specimen was determined.

A predetermined number of specimens were cut off from the bottom portion of the composite bottle, and placed in an atmosphere at −40° C. with their pinch-off portions directed upward. A 1-kilogram weight having a hemispherical end with a diameter of 8 mm was let fall onto the pinch-off portions of the specimens from various heights, and the height of weight fall which led to destruction of 50% of the specimens was determined. This height was defined as the low-temperature impact strength (m).

TABLE 1

| Sample | Comonomer Type | Content (mole %) | $MI_2$ (g/10 min.) | $[\eta]$ (dl/g) | $MI_2/[\eta]^{-8.77}$ | Density (g/cm$^3$) |
|---|---|---|---|---|---|---|
| a (*) | none (Low-density polyethylene) | 0 | 2.3 | 1.22 | 13 | 0.920 |
| b | propylene | 0.2 | 10.6 | 1.30 | 106 | 0.955 |
| b' | " | 0.2 | 1.2 | 2.06 | 679 | 0.956 |
| c | " | 0.2 | 0.94 | 2.22 | 1025 | 0.953 |
| c' | " | 0.2 | 1.0 | 2.15 | 823 | 0.955 |
| d | " | 15.0 | 2 | 1.70 | 210 | 0.885 |
| e | " | 0.1 | 1.4 | 2.00 | 611 | 0.966 |
| e' | " | 0.1 | 0.4 | 2.61 | 1803 | 0.958 |
| f | butene-1 | 10.0 | 20 | 1.15 | 68 | 0.900 |
| g | 4-methyl-1-pentene | 0.4 | 1.0 | 2.16 | 857 | 0.948 |
| h | propylene | 0.1 | 13 | 1.29 | 121 | 0.963 |

(*) An ethylene homopolymer produced by the conventional high-pressure polymerization process.

TABLE 2

| Sample | Ethylene polymer | Content of maleic anhydride (wt. %) | Ethylene content (mole %) | $MI_2$ (g/10 min.) | $[\eta]$ (dl/g) | $MI_{10}/MI_2$ | Density (g/cm$^3$) |
|---|---|---|---|---|---|---|---|
| i | a | 0.2 | 100 | 1.8 | 1.20 | 10 | 0.921 |
| j | b | 2.0 | 99.3 | 0.4 | 1.27 | 20 | 0.958 |
| j' | b' | 0.1 | 99.8 | 0.4 | 2.06 | 17 | 0.957 |
| k | c | 0.2 | 99.8 | 0.1 | 2.16 | 17 | 0.954 |
| k' | c | 0.2 | 99.8 | 0.4 | 2.10 | 11 | 0.954 |
| l | c | 0.4 | 99.8 | 0.2 | 2.06 | 14 | 0.955 |
| l' | c' | 0.2 | 99.8 | 0.4 | 2.12 | 11 | 0.958 |
| m | d | 1.8 | 84.5 | 0.2 | 1.70 | 9 | 0.885 |
| n | e | 0.4 | 99.9 | 0.2 | 1.92 | 23 | 0.968 |
| n' | e' | 0.16 | 99.9 | 0.2 | 2.56 | 25 | 0.960 |
| o | h | 2.0 | 99.4 | 2.0 | 1.27 | 23 | 0.965 |
| p | f | 2.0 | 89.5 | 3.4 | 1.20 | 10 | 0.905 |
| q | g | 0.2 | 99.6 | 0.3 | 2.14 | 10 | 0.950 |

TABLE 3

| | Resin in layer (A) | | | Properties of the bottle | |
|---|---|---|---|---|---|
| Example | Graft-modified ethylene resin | Maleic anhydride content (wt. %) | MI₁₀/MI₂ | Peel strength (kg/cm) | Low-temperature impact strength (m) |
| Example 1 | m | 1.8 | 9 | 5.0 | 1.8 |
| Example 2 | k | 0.2 | 17 | 5.0 | 1.9 |
| Example 3 | p | 2.0 | 10 | 7.0 | 2.3 |
| Example 4 | q | 0.2 | 10 | 4.9 | 1.7 |
| Comparative Example 1 | i | 0.2 | 10 | 2.5 | 0.4 |
| Comparative Example 2 | j | 2.0 | 20 | 2.5 | 0.5 |

TABLE 4

| | Comonomer | | MI₂ | | | | |
|---|---|---|---|---|---|---|---|
| Sample | Type | Content | (g/10 min.) | [η] (dl/g) | MI₂/[η]⁻⁸·⁷⁷ | MI₁₀/MI₂ | Density |
| r | None | 0 | 1.5 | 1.85 | 331 | 10 | 0.965 |
| s | propylene | 0.2 | 0.94 | 2.22 | 1025 | 9 | 0.953 |
| t | " | 0.1 | 1.2 | 2.10 | 804 | 30 | 0.960 |
| y | butene-1 | 0.2 | 1.1 | 2.10 | 737 | 10 | 0.955 |
| z | 4-methyl-1-pentene | 0.1 | 1.0 | 2.20 | 1007 | 10 | 0.957 |
| u | propylene | 0.2 | 1.3 | 2.04 | 675 | 14 | 0.955 |
| v | " | 0.1 | 1.4 | 1.81 | 255 | 19 | 0.955 |
| w | " | 18 | 0.5 | 2.10 | 335 | 5.7 | 0.870 |
| w' | " | 20 | 0.5 | 2.08 | 308 | 6 | 0.865 |
| x | " | 0.2 | 1.2 | 2.00 | 524 | 20 | 0.956 |

TABLE 5

| | Graft-modified ethylene resin | | | Unmodified ethylene polymer | | | Resin in layer (A) | | | Properties of the bottle | |
|---|---|---|---|---|---|---|---|---|---|---|---|
| Example | Amount (wt. %) | Type | MI₁₀/MI₂ | Amount (wt. %) | Type | MI₁₀/MI₂ | Ethylene content (mole %) | Maleic anhydride content (wt. %) | Density | MI₁₀/MI₂ | Peel strength (kg/cm) | Low-temperature impact strength (m) |
| Example 5 | 20 | l | 14 | 80 | s | 9 | 99.8 | 0.1 | 0.953 | 10 | 4.5 | 1.6 |
| Example 6 | 50 | " | " | 50 | " | " | 99.8 | 0.2 | 0.954 | 12 | 6.0 | 2.0 |
| Example 7 | 80 | " | " | 20 | " | " | 99.8 | 0.3 | 0.955 | 13 | 6.5 | 2.0 |
| Example 8 | 50 | " | " | 50 | y | 10 | 99.8 | 0.2 | 0.955 | 13 | 6.0 | 2.0 |
| Example 9 | 50 | " | " | 50 | z | 10 | 99.9 | 0.2 | 0.956 | 13 | 6.1 | 2.0 |
| Example 10 | 50 | " | " | 50 | r | 19 | 99.9 | 0.2 | 0.960 | 16 | 5.6 | 1.5 |
| Example 11 | 25 | n | 23 | 75 | s | 9 | 99.9 | 0.1 | 0.960 | 17 | 5.1 | 1.6 |
| Example 12 | 25 | l | 14 | 45 / 30 | v / w | 19 / 5.7 | 94.0 | 0.1 | 0.930 | 13 | 6.0 | 1.8 |
| Example 13 | 25 | l | 14 | 65 / 10 | v / w | 19 / 5.7 | 97.9 | 0.1 | 0.947 | 15 | 5.5 | 1.5 |
| Example 14 | 8 | o | 23 | 62 / 30 | x / w | 20 / 5.7 | 93.8 | 0.2 | 0.933 | 16 | 4.5 | 1.3 |
| Comparative Example 3 | 25 | l | 14 | 75 | t | 30 | 99.9 | 0.1 | 0.959 | 25 | 2.3 | 0.5 |
| Comparative Example 4 | 8 | o | 23 | 92 | u | 14 | 99.8 | 0.2 | 0.960 | 28 | 1.4 | 0.3 |

Examples 5 to 14 and Comparative Examples 3 and 4

Each of the graft-modified ethylene resins shown in Table 2 was mixed with at least one of the unmodified ethylene polymers described in Table 4 by a tumbler blender, and the mixture was pelletized by an extruder at a resin temperature of 210° C. A three-layer laminated bottle was formed in the same way as in Example 1 except that the resulting pellets were used as the layer (A). The properties of the bottle are shown in Table 5.

Examples 15 to 18 and Comparative Examples 5 to 7

A three-layer composite bottle was formed in the same way as in Example 1 except that an ethylene/vinyl alcohol copolymer (a saponification product having a degree of saponification of 99% of an ethylene/vinyl acetate copolymer containing 31 mole% of ethylene) was used as the layer (B) and the resin layer (A) shown in Table 6 was used. The properties of the bottle are shown in Table 6.

TABLE 6

| | Graft-modified ethylene resin | | | Unmodified ethylene polymer | | | Resin in layer (A) | | | Properties of the bottle | |
|---|---|---|---|---|---|---|---|---|---|---|---|
| Example | Amount (wt. %) | Type | MI₁₀/MI₂ | Amount (wt. %) | Type | MI₁₀/MI₂ | Ethylene content (mole %) | Maleic anhydride content (wt. %) | Density | MI₁₀/MI₂ | Peel strength (kg/cm) | Low-temperature impact strength (m) |
| Example 15 | 100 | k' | 11 | — | — | — | 99.8 | 0.2 | 0.954 | 11 | 4.3 | 1.3 |
| Example 16 | 90 | j' | 17 | 10 | w' | 6 | 98.0 | 0.14 | 0.945 | 9 | 3.8 (23° C.) 1.9 (100° C.) | 1.3 |
| Example 17 | 50 | l | 14 | 50 | r | 19 | 99.9 | 0.2 | 0.960 | 16 | 4.0 | 1.3 |
| Example 18 | 25 | n | 23 | 75 | s | 9 | 99.9 | 0.1 | 0.960 | 17 | 4.1 | 1.4 |
| Comparative Example 5 | 100 | j | 20 | — | — | — | 99.3 | 2.0 | 0.958 | 20 | 0.8 | 0.1 |

TABLE 6-continued

| | Graft-modified ethylene resin | | | Unmodified ethylene polymer | | | Resin in layer (A) | | | | Properties of the bottle | |
|---|---|---|---|---|---|---|---|---|---|---|---|---|
| Example | Amount (wt. %) | Type | $MI_{10}/MI_2$ | Amount (wt. %) | Type | $MI_{10}/MI_2$ | Ethylene content (mole %) | Maleic anhydride content (wt. %) | Density | $MI_{10}/MI_2$ | Peel strength (kg/cm) | Low-temperature impact strength (m) |
| Comparative Example 6 | 25 | l | 14 | 75 | t | 30 | 99.9 | 0.1 | 0.959 | 25 | 0.9 | 0.1 |
| Comparative Example 7 | 8 | o | 23 | 92 | u | 14 | 99.8 | 0.2 | 0.960 | 28 | 0.7 | 0.1 |

Examples 19 and 20 and Comparative Example 8

A three-layer composite bottle was formed in the same way as in Example 5 except that the resin layer shown in Table 7 was used. The peel strength of the bottle was measured at 23°, 60°, 80° and 100° C. respectively, and the average of the measured peel strengths at these temperatures is shown in Table 7.

TABLE 7

| | Graft-modified ethylene resin | | | Unmodified ethylene polymer | | | Resin in layer (A) | | | | Peel strength measured at a temperature (°C.) | | | |
|---|---|---|---|---|---|---|---|---|---|---|---|---|---|---|
| Example | Amount (wt. %) | Type | $MI_{10}/MI_2$ | Amount (wt. %) | Type | $MI_{10}/MI_2$ | Ethylene content (mole %) | Maleic anhydride content (wt. %) | Density | $MI_{10}/MI_2$ | 23 | 60 | 80 | 100 |
| Example 19 | 90 | l' | 11 | 10 | w' | 6 | 97.8 | 0.20 | 0.949 | 9 | 6.5 | 5.2 | 4.1 | 2.9 |
| Example 20 | 90 | j' | 17 | 10 | w' | 6 | 97.8 | 0.09 | 0.950 | 15 | 4.0 | 3.0 | 1.4 | 1.1 |
| Comparative Example 8 | 90 | n' | 25 | 10 | w' | 6 | 97.9 | 0.13 | 0.951 | 20 | 2.0 | 1.0 | 0.2 | <0.1 |

Examples 21 and 22 and Comparative Examples 9 and 10

A cylindrical three-layer composite container having an inner capacity of 50 liters and composed of an outer layer of high-density polyethylene (thickness 5 mm), an interlayer of the resin (A) (thickness 0.1 mm) and an inner layer of 6-nylon (thickness 0.2 mm) was formed by the method shown in Example 1 using the resin (A) shown in Table 8. The peel strength of the container was measured in the same way as in Example 1.

A falling test for the container was performed at 23° C., and the minimum falling height (meters) which caused the destruction of the container was measured, and defined as falling impact strength. The results are shown in Table 8.

another extruder, and fed to the coextrusion die at a resin temperature of 250° C. These molten resins were extruded from the coextrusion die and quenched by a cooling roll at 30° C. to form a two-layer film.

The polyester resin used was a mixture of 90 parts by weight of polybutylene terephthalate having an intrinsic viscosity, measured at 25° C. in a 1% o-chlorophenol solution, of 0.90 and 10 parts by weight of a polyester having an intrinsic viscosity of 0.85 and derived from dimethyl terephthalate, ethylene glycol and diethylene glycol.

A test specimen, 25 mm in width, was cut out from the two-layer film, and subjected to a peel test by an Instron tester at a pulling speed of 50 mm/min. The peel strength of the specimen was 1.8 kg/cm.

Comparative Example 11

Maleic anhydride was grafted to the ethylene polymer e described in Table 1 to prepare maleic anhydride-modified ethylene resin having a maleic anhydride content of 0.2% by weight, a density of 0.968, an $MI_2$ of 0.6 and an $MI_{10}/MI_2$ ratio of 21.

Example 23 was repeated except that the resulting graft-modified ethylene resin was used instead of the

TABLE 8

| | Graft-modified ethylene resin | | | Unmodified ethylene polymer | | | Resin in layer (A) | | | | Properties of the bottle | |
|---|---|---|---|---|---|---|---|---|---|---|---|---|
| Example | Amount (wt. %) | Type | $MI_{10}/MI_2$ | Amount (wt. %) | Type | $MI_{10}/MI_2$ | Ethylene content (mole %) | Maleic anhydride content (wt. %) | Density | $MI_{10}/MI_2$ | Peel strength (kg/cm) | Falling impact strength (m) |
| Example 21 | 100 | k' | 11 | — | — | — | 99.8 | 0.2 | 0.954 | 11 | 9.5 | 10 |
| Example 22 | 80 | l | 14 | 20 | s | 9 | 99.8 | 0.3 | 0.955 | 13 | 8.9 | 10 |
| Comparative Example 9 | 100 | i | 10 | — | — | — | 100 | 0.2 | 0.921 | 10 | 1.9 | 1.0 |
| Comparative Example 10 | 100 | j | 20 | — | — | — | 99.3 | 2.0 | 0.958 | 20 | 2.7 | 1.5 |

Example 23

The resin k' ($MI_{10}/MI_2=11$) described in Table 2 was melted by an extruder, and fed to a coextrusion die for forming a two-layer film while keeping the resin temperature at 230° C. A polyester resin was melted in resin k'. The resulting two-layer film had a peel strength of 0.6 kg/cm.

Example 24

Maleic anhydride was grafted to an ethylene/butene-1 copolymer (butene-1 content 3.2 mole%; density 0.925; $MI_2$ 4.0; $MI_2/[\eta]^{-8.77}=323$) to prepare a graft-modified ethylene resin having a maleic anhydride content of 0.2% by weight, an $MI_2$ of 1.9, and $MI_{10}/MI_2$ ratio of 9 and a density of 0.926.

This modified resin was bonded under pressure to each of (a) an aluminum foil and (b) a steel sheet, each of which had been degreased, at 200° C. for 5 minutes (the resin layer 1 mm thick; the metal layer 0.1 mm thick) to form a laminated sheet. A test specimen, 20 mm in width, was cut away from the laminated sheet. The specimen was partly delaminated, and its peel strength was measured by an Instron tester at a chuck speed of 100 mm/min.

The results obtained are shown in Table 9. In Table 9, "Al broken" means that the aluminum base material itself broke before the bonded part was delaminated. The force exerted at break was more than 16 kg/cm.

Comparative Example 12

Example 24 was repeated except that the maleic anhydride-grafted ethylene resin described in Table 2 was used instead of the grafted ethylene resin used in Example 24. The peel strength of the resulting metal laminated sheet was measured, and the results are shown in Table 9.

TABLE 9

|  | Peel strength (kg/cm) | |
| --- | --- | --- |
|  | Al-laminated sheet | Steel-laminated sheet |
| Example 24 | Al broken | 9.8 |
| Comparative Example 12 | 3.0 | 4.1 |

Examples 25 and 26

To an ethylene/propylene copolymer containing 0.2 mole% of propylene component ($MI_2$ 0.94, density 0.953, $MI_{10}/MI_2$ 1025) was grafted 0.3% by weight of bicyclo[2.2.1]hept-5-ene-2,3-dicarboxylic anhydride to prepare a graft-modified ethylene resin E having an $MI_2$ of 0.2, an $MI_{10}/MI_2$ ratio of 13 and a density of 0.954.

Separately, to the same ethylene/propylene copolymer was grafted 0.3% by weight of cyclohex-4-ene-1,2-dicarboxylic anhydride to prepare a graft-modified ethylene resin F having an $MI_2$ of 0.1, an $MI_{10}/MI_2$ of 15, and a density of 0.954.

A 50-liter three-layer composite container was produced in the same way as in Example 21 using the graft-modified ethylene resin E or F. The peel strength and falling impact strength of the container were measured, and the results are shown in Table 10.

TABLE 10

|  | Graft-modified ethylene resin | Peel strength | Falling impact strength |
| --- | --- | --- | --- |
| Example 25 | E | 8.9 | 9.5 |
| Example 26 | F | 8.8 | 9.8 |

What we claim is:

1. In a laminated multilayer structure composed of (A) a layer of a graft-modified ethylene resin grafted with an unsaturated carboxylic acid or a functional derivative thereof and (B) an oxygen- or nitrogen-containing polar resin layer or a metal layer in contact with the layer (A); the improvement wherein
(1) the layer (A) consists of
   (i) 1 to 100% by weight of said graft-modified ethylene resin derived from an ethylene polymer which contains 0 to 15 mole% of at least one alpha-olefin having 3 to 30 carbon atoms as a comonomer and has an $MI_2/[\eta]^{-8.77}$ ratio in absolute value of not less than 15 and a density of 0.88 to 0.98 g/cm$^3$, and
   (ii) 99 to 0% by weight of an unmodified ethylene polymer containing 0 to 50 mole% of at least one alpha-olefin having 3 to 30 carbon atoms as a comonomer and having an $MI_2/[\eta]^{-8.77}$ ratio in absolute value of not less than 15 and a density of 0.86 to 0.96 g/cm$^3$, and
(2) the layer (A) has
   (a) an ethylene content of not less than 80 mole%,
   (b) a content of the carboxylic acid or the derivative thereof of 0.01 to 10% by weight based on the weight of the layer (A),
   (c) a density of 0.88 to 0.98 g/cm$^3$, and
   (d) an $MI_{10}/MI_2$ ratio of from 5 to 18.

2. The structure of claim 1 wherein layer (B) is the oxygen- or nitrogen-containing polar resin layer which is a layer of at least one resin selected from the group consising of polyamide resins, saponified copolymers of ethylene and vinyl acetate, and polyester resins.

3. The structure of claim 1 wherein the unsaturated dicarboxylic acid is an unsaturated dicarboxylic acid having 4 to 10 carbon atoms.

4. The structure of claim 1 wherein layer (B) is the metal layer which is a layer of a metal selected from Al, Fe, Cu, Sn, Ni, and alloys thereof.

5. The structure of claim 1 wherein
(1) the layer (A) consists of
   (i) 3 to 100% by weight of said graft-modified ethylene resin, and
   (ii) 97 to 0% by weight of said unmodified ethylene polymer, and
(2) the layer (A) has
   (a) an ethylene content of not less than 90 mole%,
   (b) a content of the carboxylic acid or the derivative thereof of 0.1 to 5% by weight based on the weight of the layer (A), and
   (d) an $MI_{10}/MI_2$ ratio of from 6 to 18.

6. The structure of any one of claims 1, 2, 3, 4 or 5 wherein the layer A consists of 100% by weight of said graft-modified ethylene resin.

7. The structure of any one of claims 1, 2, 3, 4 or 5 wherein the layer (A) consists of a blend of the graft-modified ethylene resin (i) and the unmodified ethylene polymer (ii).

* * * * *